United States Patent Office 2,879,746
Patented Mar. 31, 1959

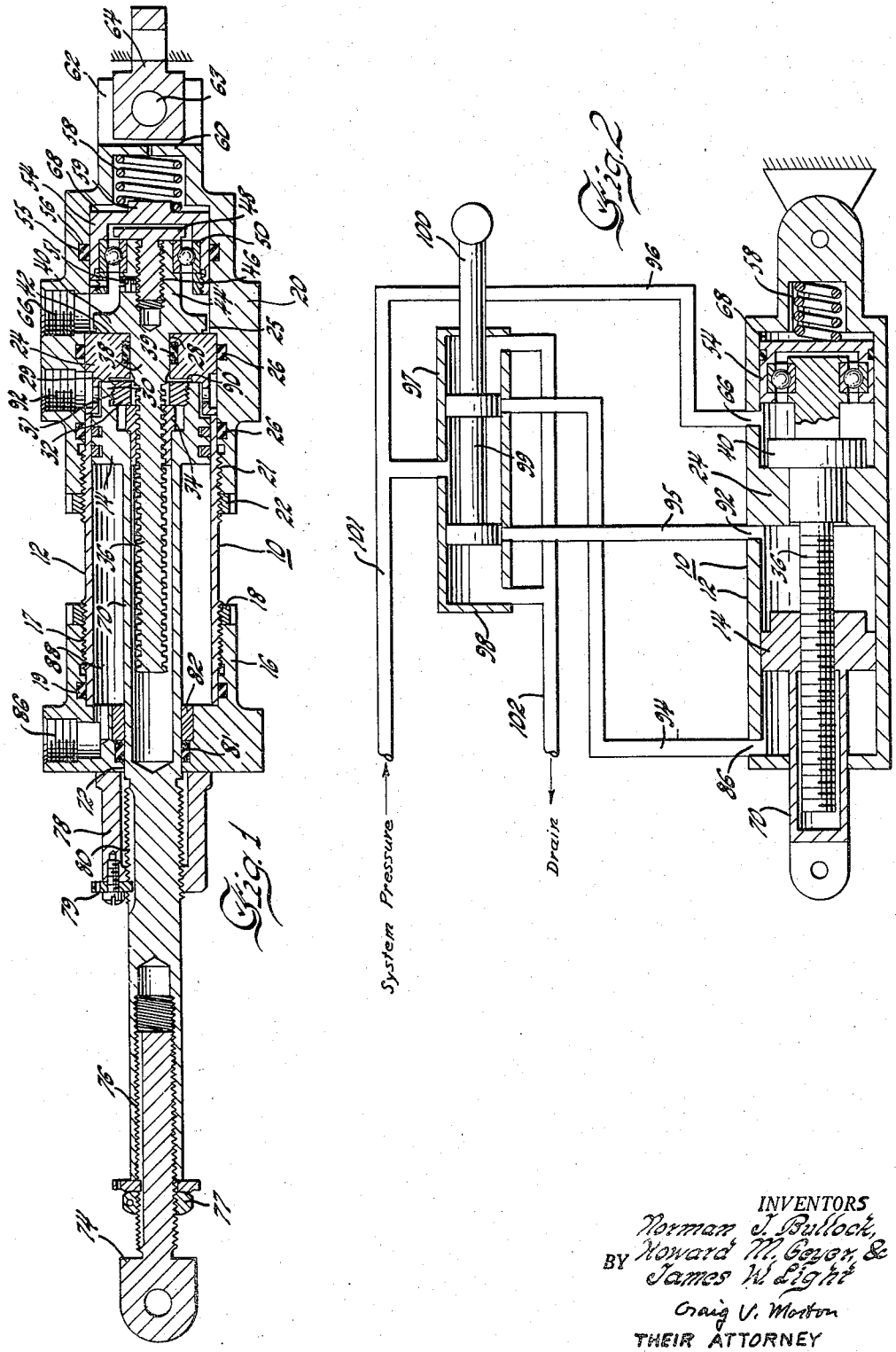

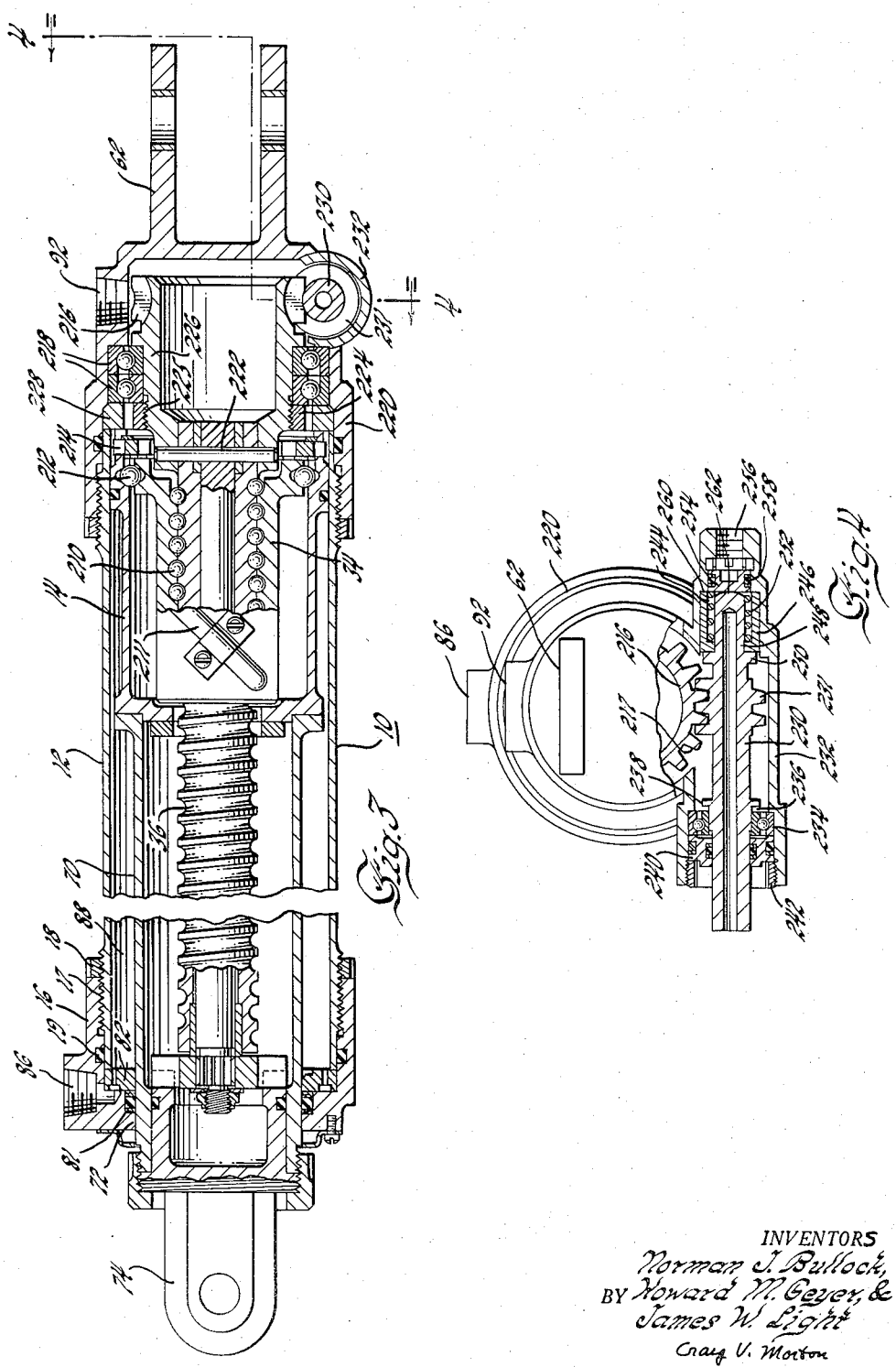

2,879,746

ACTUATOR WITH UNIDIRECTIONAL LOCKING MEANS

Howard M. Geyer and Norman J. Bullock, Dayton, and James W. Light, Greenville, Ohio, assignors to General Motors Corporation, Detroit, Mich., a corporation of Delaware Application December 8, 1955, Serial No. 551,801

5 Claims. (Cl. 121—40)

This invention pertains to linear fluid pressure operated actuators and particularly to an actuator with a unidirectional locking means.

Heretofore, it has been the practice to incorporate self-locking devices in fluid pressure actuators which arrest movement of the reciprocating piston at any position in its cylinder upon failure and decrease of fluid pressure or abnormal load conditions. The present invention is an improvement over the copending application, Serial No. 455,435, Geyer, filed September 13, 1954, now Patent No. 2,804,054 issued Aug. 27, 1957, wherein a self-locking fluid pressure actuator of the plain bearing type is disclosed. Accordingly, among our objects are the provision of a fluid pressure actuator having locking means of the plain bearing type which are only operable to prevent actuator movement in one direction; a further provision of an actuator including a freely rotatable and axially movable connection of a lock release piston and an element cooperating freely with the actuator piston during normal operation with locking means of the plain bearing type engageable thereby upon malfunction of actuator movement; and still further the provision of a locking actuator including a lock release piston for axially moving a rotatable element carrying the braking surface out of any possible further engagement with the plain bearing.

The aforementioned and other objects are accomplished in the present invention by incorporating a unidirectional locking means normally positively disengaged by a fluid pressure operated lock release piston that axially moves a rotatable element carrying a braking surface out of any possible engagement with a plain bearing. Specifically, the actuator comprises a cylinder having disposed therein a reciprocal piston capable of fluid pressure actuation in opposite directions. The piston is rotatably engaged with an element capable of limited axial movement. This axial movement occurs while the element is freely rotatable in its journals to stop rotation thereof and lock the actuator. The element, screw shaft, or worm shaft, is formed with an annular shoulder which cooperates with a braking surface adapted for engagement with a plain bearing effecting unidirectional locking of the actuator upon failure of fluid pressure.

In one embodiment of this invention, axial movement is effected with a second piston or reciprocal member connected to the element through a carriage capable of permitting rotation relative to the second piston and element under normal loads. Upon failure of fluid pressure, the actuator is automatically locked by axial brake engaging movement of the screw shaft, or element, to prevent further rotation by stopping movement thereof in one direction. The braking surface is formed as one side of a partition transversely disposed in the cylinder between the first and second pistons. The opposite side of the partition forms a positive stop for the movement of the first piston to its fully retracted position.

In another embodiment of the invention, the second piston also axially moves the element, or transversely journalled worm shaft, having an annular shoulder, for effecting brake actuation. Axial movement of the worm shaft accompanies rotation of means rotatably connecting an actuator piston and the element in non-self-locking relation. The means includes a worm gear operably engaged to effect linear movement of the locking member in one direction thereby effecting positive brake disengagement of the braking surfaces. The unidirectional locking means of the present invention will be more particularly described hereinafter.

Further objects and advantages of the present invention will be apparent from the following description, reference being had to the accompanying drawings wherein preferred embodiments of the present invention are clearly shown.

In the drawings:

Figure 1 is an elevational view taken in longitudinal section of a preferred embodiment of an actuator incorporating the present invention.

Figure 2 is a schematic diagram of a control system for an actuator of the type disclosed herein with the actuator in locked position.

Figure 3 is an elevational view taken in partial longitudinal section of another embodiment of an actuator incorporating the present invention.

Figure 4 is an end view taken partially in section along line 4—4 of Figure 3.

With particular reference to Figure 1, the actuator shown generally by the numeral 10 comprises a cylinder 12 having a piston 14 reciprocally disposed therein. An end cap 16 is threaded into engagement with a threaded portion 17 on the exterior periphery of one end of the cylinder 12. A lock nut 18 is also threaded onto the cylinder 12 is screwed into tight engagement with the end cap 16 providing a lock fit between the cylinder 12 and end cap 16. A packing 19 provides a fluid seal between the end cap 16 and cylinder 12.

In the preferred embodiment of the present invention as shown in Figure 1, an auxiliary chamber member 20 is fitted onto threaded portion 21 on an opposite end of the cylinder 12. A lock nut 22 also threaded onto cylinder 12 firmly establishes a fixed engagement between the cylinder 12 and chamber member 20. A partition 24 is transversely disposed in fixed relationship with respect to the chamber member 20 as the latter is threaded into tight engagement with the cylinder 12. The partition 24 is rigidly fixed between an edge of the cylinder 12 and a reduced diameter portion 25 formed with the chamber member 20. A pair of seals 26 provide sealing engagement between the cylinder 12, the partition 24 and the chamber member 20. The partition 24 is provided with a central aperture 28, the purpose of which will be explained later.

An annular shoulder portion 29 of the partition 24 forms a positive stop for a head portion 30 of the piston 14 in a position representing the fully retracted movement of the piston as illustrated in Figure 1. The head portion 30 of the piston 14 is provided with internal threads 31 and a locking ring 32 is threaded into engagement therewith to non-rotatably retain an internally threaded nut 34 in operative relationship with the piston 14. The internal threads of the nut 34 operatively engage an element, or screw shaft, 36, in non-self-locking relationship in a conventional manner. The screw shaft 36 is formed integral with a rod portion 38 which journals the screw shaft 36 through the central aperture 28 of the partition 24 with a packing 39 providing a seal between the portion 38 and partition 24. Connected to the rod portion 38 is an annular portion, or shoulder, 40, of the screw shaft 36 which extends radially outwardly to provide a cooperating surface 42 capable of engaging the partition 24 on the side of the partition opposite the annular shoulder portion 29 forming a retract stop abutment for the head portion 30 of the piston 14. The surface 42 provides a unidirectional locking means or braking surface to prevent relative rotation of the annular portion 40 of screw shaft 36 with respect to the partition 24 during periods of operation to be explained in further detail below.

The annular portion 40 of screw shaft 36 includes an axially extending sleeve portion 44 provided with internal threads 46 which threadedly receive an assembly cap 48. The assembly cap 48 retains a ball bearing, or carriage, 50, in fixed relation to the outer periphery of sleeve portion 44 of the screw shaft 36. A set screw 51 threadedly mounted through the sleeve 44 locks the cap 48 in position with respect to the screw shaft 36. The bearing 50 is connected through its outer raceway to a reciprocal member or second piston 54 operably disposed in the auxiliary chamber member 20 with a packing 55 disposed in an annular groove 56 of the chamber member 20 providing a seal between the member 54 and chamber member 20. Thus, the element, or screw shaft, 36, is movably supported by a journalled relationship with partition 24 and bearing, or carriage, 50. A coil spring 58 is axially disposed with respect to the member 54 between a head portion 59 of the member 54 and an end portion 60 of the chamber member 20. This spring is movable only in an axial direction and is free of rotation due to the fact that the member, or piston, 54, is independent of rotation with regard to the screw shaft 36 due to bearing 50 even though it is rigidly attached for movement axially together with the screw shaft 36. The piston 54 is not axially movable relative to screw shaft yet the piston 54 is adapted to be independent of screw shaft rotation though it is adapted to be moved axially together with the screw shaft 36 due to the operative relationship between the piston 54 and screw shaft 36 provided by bearing means, or carriage, 50. The piston 54 being independent of rotation with regard to screw shaft 36 causes packing 55 to be free of wear due to relative rotation between piston 54 and chamber member 20 as to packing 55. The spring 58 normally biases or urges the annular portion 40 of the screw shaft 36 into cooperating relationship with the partition 24 to cause frictional engagement therebetween for the purpose to be explained below.

Near the end portion 60 of chamber member 20 is a bracket 62 adapted for attachment to a stationary means 64 by means of a pin 63. A fluid port 66 is provided to permit fluid pressure actuation of the member, or piston, 54, in an axial direction opposed to the urging of the spring 58. Movement in this direction is permitted to a limited extent axially as shown by a space 68 in Figure 1. This movement necessarily causes a comparable movement positively disengaging the surface 42 from the partition 24 by a space comparable to that represented by the numeral 68, along with retraction of the piston 14 by an amount comparable to that space due to the fact that the screw shaft 36 is interconnected with the piston 14 by nut 34 as outlined above.

The piston 14 is connected through a rod portion 70 which extends through a central aperture 72 of the end cap assembly 16 to a non-rotatable load 74 by means of a threaded portion 76. A lock nut 77 provides an adjustment for the connection between the piston rod 70 and load 74. Further adjustment for limiting the retract movement of the piston 14, if desired, is provided by a sleeve 78 disposed with a lock member 79 cooperable with a keyway 80 in the piston rod 70. A packing 81 retained by a ring 82 provides a seal between the piston rod 70 and the aperture 72 of end cap 16. The end cap 16 is provided with a retract port 86 in communication with a retract chamber 88 formed in one portion of the cylinder 12 divided by the piston 14 into a second portion comprising an extend chamber 90 communicating with an extend port 92 formed in the auxiliary chamber member 20 as shown in Figure 1.

Figure 2 shows a schematic diagram to illustrate fluid pressure control means for selectively operating the actuator embodying the present invention with the ports 86, 92, and 66 connected to pipes 94, 95 and 96, respectively. A control valve 97, comprising, a cylinder 98 and valve member 99 which is movable through a lever 100 into various positions, connects the pipes 94 and 95 to system pressure supplied in fluid form through the pipe 101 in accordance with the setting of the valve member 99. A drain pipe 102 is also connected through conventional fittings to the cylinder 97. When the valve member 99 is in a position providing pressure from pipe 101 to pipe 94, the piston 14 is actuated in a retract movement in cylinder 12.

Similarly, when pressurized fluid is supplied to the pipe 95, an extend movement occurs moving the piston to the left as shown in Figure 2. This extend movement continues so long as the load on the piston rod 70 is a compression load and no failure occurs in the fluid pressure actuation or in the load itself to cause a tension to be placed upon the piston 14. When a tension is placed upon the piston 14 and the fluid pressure system fails, the relative parts of the actuator in the present invention are positioned as shown in Figure 2 where the annular portion 40 of the screw shaft 36 is in operative engagement with the partition 24 to effect a unidirectional braking action. This braking action stops the movement of the actuator in an extend direction as illustrated and prevents the load, for example, an aircraft control surface, from moving to a further extended position. This unidirectional locking feature is provided for safety to prevent unwanted load movement in one direction which may otherwise endanger the aircraft itself. The locking or braking action between the annular portion 40 and partition 24 in the structure shown cannot occur when opposite movement is attempted because then the piston 14 can move axially to the right under any condition with the surfaces of the annular portion 40 and partition 24 separated by a space equivalent to that represented by the numeral 68. As long as a unidirectional tension load remains on the piston 14, the locking means remain effective to prevent further actuator movement in that direction.

To release the locking means, fluid pressure must be supplied from system pressure through pipe 101 and pipe 96 to the port 66 communicating with the auxiliary chamber 20 thereby causing movement of the member, or second piston, 54, in opposition to the biasing, or urging, of spring 58. The axial movement of the member 54 caused in this manner is transferred through the bearing, or carriage, 50, to the screw shaft 36 through structure outlined above. This effects an axial movement of the screw shaft 36 which serves to retract the tension loaded piston 14 and also to separate the annular portion 40 from partition 24 thereby disengaging the locking means or braking action between these members. The axial movement of the screw shaft 36 in retracting the tension loaded piston 14 is again equal to the space as indicated by the numeral 68. During normal operation of the actuator, fluid pressure on the member 54 prevents the axial movement required to engage the unidirectional locking means and actuating movement is possible in an extend or retract direction in a conventional manner.

Referring to Figure 3, another embodiment of the present invention is shown in an actuator generally indicated by the numeral 10. Parts of the actuator in Figure 3 comparable to those of the actuator in Figure 1 have corresponding numbering. Parts differing in the unidirectional locking means from those of Figure 1 are numbered 200 or above. In the embodiment in Fig. 3, the piston 14 is rotatably journalled to the screw shaft 36 through the agency of a plurality of balls 210 which operatively engage an internally threaded portion of the nut 34. A conventional circulating return path 211 for balls 210 is carried by the nut 34. The nut 34 is coupled to the piston 14 through a thrust bearing 212 and Oldham coupling 214 as disclosed in our copending application, S. N. 551,823, filed of even date herewith, now U. S. Patent 2,806,450, issued September 17, 1957. A gear member 216 is rotatably journalled by bearings 218 disposed in the auxiliary member 220 and is attached to the screw shaft 36 by means of a transverse pin 222 to rotate therewith. Gear member 216 and screw shaft 36 of this embodiment cannot move axially. A lock nut 224 is threaded onto a threaded portion 225 of the gear member 216 to retain the inner raceways of the bearings 218 in place on an annular shoulder 226 formed integral with the gear member. The outer raceway is retained in proper spaced relationship by means of a spacer 228 tightly fitted between the cylinder 12 and the member 220 upon assembly thereof.

As shown in Figure 4, the gear 216 operatively engages a worm shaft or axially movable element 230, rotatably journaled in a housing 232 by means of bearings 234. Gear 216 can rotate worm shaft 230 with toothed portion 231 when the shaft is in an unrestraint position as set forth in further detail below. The housing 232 is formed to be connected with the member 220 and may be joined as by brazing thereto. The worm shaft 230 with toothed portion 231 is axially movable through a distance represented by a space 236 between the inner raceway of the bearing 234 and an annular portion 238 formed with the worm shaft 230. A suitable sealing means 240 retained by a lock nut 242 is provided at one end of the housing 232. The other end of the housing 232 is provided with an auxiliary chamber, or second cylinder, 244, coaxial with the worm shaft 230. A centrally apertured partition 246 is axially disposed about a reduced diameter journal portion 248 of the worm shaft 230 and engaged against an annular shoulder 250 of the worm shaft 230 by means of a coil spring 252 biasing, or urging, the partition 246 against the annular shoulder 250 with respect to a second piston, or member, 254. Member 254 is disposed in the chamber 244 to be axially movable by fluid pressure means communicating through the port 256 in opposition to urging of spring 252. A suitable packing 258 is provided as a seal between the piston 254 and the auxiliary chamber, or second cylinder, 244. The member 254 is non-rotatably disposed but axially movable with element 230 to operate as outlined below without wear due to relative rotation on packing 258.

The fluid pressure connections for the embodiment of the present invention as shown in Figures 3 and 4 are similar to those illustrated in Figure 2. The port 256 of Figure 4 is comparable, in purpose, to the port 66 of the actuator in Figure 1.

In operation, the actuator of Figure 3 is capable of movement in a retract and extend direction in accordance with fluid pressure supplied through ports 86 and 92 by a control system like that shown in Figure 2. The annular shoulder 250 of the worm shaft 230 shown in Figure 4 is axially movable to the right as shown in Figure 4 to cause engagement between the partition 246 and an annular shoulder 260 in the housing 232. When these parts engage in this manner, a braking action or unidirectional locking means takes effect and rotation of the worm shaft 230 is stopped. Simultaneously, the gear 216 is stopped from rotating through teeth 217 in mesh with the toothed portion 231 of worm shaft 230 to prevent rotation of the screw shaft 36 and thereby lock the movement of piston 14.

The threads of the screw shaft as illustrated in Figure 3 are adapted to cooperate to cause a counterclockwise rotation of the teeth 217 of the gear member 216 when the piston is extended so that if a failure occurs in the fluid pressure actuation or malfunction occurs in a load being moved in this direction, counterclockwise rotation of the gear 216 causes an axial movement of the worm shaft 230 to the right as viewed in Figure 4 effecting engagement of the unidirectional locking means or braking surfaces stopping the rotation and further extend movement of the actuator. The worm shaft 230 is moved in a manner similar to a rack and pinion when this tension loading takes place on the piston 14.

To release the locking means, it is necessary to first supply fluid pressure through a pipe (comparable to pipe 96 of Figure 2) providing fluid communication through the port 256 to move the second piston, or member, 254, in an axial direction to the left as viewed in Figure 4 effecting axial movement thereof equivalent to the space 236 to positively disengage and release the locking means. This axial movement is effected by member 254 through a tip 262 of the worm shaft 230. The axial movement itself causes a rack and pinion engagement between the worm shaft and the gear 216, respectively. This effects a rotation of the screw shaft 36 causing a retraction of the piston 14 from the tension loading thereof and simultaneously releasing the unidirectional locking means. The retraction movement of the piston 14 is not locked or stopped under any conditions because the threads on the screw shaft 36, as shown in Figure 3, will cause a clockwise rotation of the gear 216 which will shift the worm shaft 230 and the locking means axially to the left as viewed in Figure 4. With clockwise rotation of gear 216, the worm shaft 230 is freely rotatable in the bearing and journals provided. These parts are also freely rotatable during normal fluid pressure actuation while the unidirectional locking means are disengaged.

While the embodiments of the present invention as herein disclosed constitute preferred forms, it is to be understood that other forms might be adopted.

What is claimed is as follows:

1. A mechanism comprising a linear fluid pressure actuator having a cylinder and a first piston reciprocally disposed therein, means for effecting work by reciprocating said first piston in a retract and extend movement, a spring means disposed in one end of said actuator in an axis at right angles to the axis of said actuator, a partition disposed coaxial with said spring means, a worm member rotatably journalled in said actuator, operatively connected to the piston and axially movable with respect to said partition, said worm having an annular shoulder cooperable with said partition, a second piston operably engaged by said spring means normally urging said partition into engagement with said shoulder, said shoulder and partition constituting locking means for preventing movement of said first piston, and means for axially moving said second piston to positively disengage said locking means.

2. The combination comprising a linear fluid pressure actuator including, a cylinder and a first piston reciprocally disposed therein, fluid pressure control means selectively operable to effect work by reciprocating said first piston in a retract and extend movement, an auxiliary chamber having an axis at right angles to the linear axis of said retract and extend movement, a centrally apertured partition dividing said chamber from other parts of said actuator, a second piston reciprocally disposed in said chamber, a rotatably journalled member disposed to be axially movable by said second piston in sealing engagement through the aperture of said partition, a unidirectional locking means connected with said member axially engageable with said partition, means rotatably engaging said member in non-self-locking relation with said first piston whereby tension on said first piston during movement thereof in one direction causes said member to move axially effecting engagement between said locking means and said partition, and a connection with said fluid pressure control means whereby said second piston is moved axially to effect linear movement of said member retracting said first piston together with disengagement of said locking means.

3. An actuator assembly comprising in combination, a first cylinder, a first piston reciprocally disposed therein, fluid pressure controlling means selectively operable to effect retract and extend movement thereof, a second cylinder disposed at right angles to said first cylinder, a second piston reciprocally disposed in said second cylinder, a plain bearing surface disposed with said second cylinder, a member rotatably journalled and axially movable through said surface by said second piston, gearing operably connecting said member for non-self-locking rotation and/or axial movement upon reciprocating movement of said first piston, a unidirectional locking means connected with said member and engageable on said surface by a load acting in one direction on said first piston during extend movement thereof, and release means operable through said second piston to retract said first piston and to simultaneously disengage said locking means through said axially movable member.

4. A fluid pressure operated actuator comprising, a cylinder having a reciprocal piston therein, an axially immovable element rotatably journalled in the cylinder and operatively connected to the piston so that piston movement effected is dependent upon rotation of the element, unidirectional locking means operatively connected with said element for preventing rotation thereof in one direction, said locking means including an axially movable member rotatably journalled in an axis transverse to the axis of said element and operatively connected thereto, means operably engaged by said member for preventing rotation thereof in one direction, said locking means being automatically releasable upon rotating said element in the opposite direction and fluid pressure operated means for releasing said locking means to permit rotation of the element in said one direction.

5. A fluid pressure operated actuator including, a cylinder having a reciprocal piston therein, an axially immovable element rotatably journalled in the cylinder and operatively connected to the piston so that piston movement effected is dependent upon rotation of the element, unidirectional locking means operatively connected with said element for preventing rotation thereof in one direction, said element comprising a screw shaft having a worm gear attached thereto, a worm member drivingly engaging the worm gear to be axially movable and rotatable relative thereto, means operably engaged by said worm member for preventing rotation thereof in one direction, said locking means being automatically releasable upon rotating said element in the opposite direction and fluid pressure operated means for releasing said locking means to permit rotation of the element in said one direction.

References Cited in the file of this patent
UNITED STATES PATENTS

| | | |
|---|---|---|
| 1,643,563 | Nell | Sept. 27, 1927 |
| 2,467,026 | Giger | Apr. 12, 1949 |
| 2,523,053 | Obrist | Sept. 19, 1952 |
| 2,632,426 | Geesink | Mar. 24, 1953 |
| 2,640,515 | Johnson | June 2, 1953 |
| 2,758,571 | Mackintosh | Aug. 14, 1956 |

FOREIGN PATENTS

| | | |
|---|---|---|
| 211,847 | Germany | July 13, 1909 |
| 683,633 | Great Britain | Dec. 3, 1952 |